United States Patent
Huke et al.

(10) Patent No.: US 10,878,969 B2
(45) Date of Patent: Dec. 29, 2020

(54) DUAL FLUID REACTOR

(71) Applicant: Armin Huke, Berlin (DE)

(72) Inventors: Armin Huke, Berlin (DE); Götz Ruprecht, Berlin (DE); Ahmed Hussein, Vancouver (CA); Konrad Czerski, Berlin (DE); Stephan Gottlieb, Berlin (DE)

(*) Notice: Subject to any disclaimer, the term of this patent is extended or adjusted under 35 U.S.C. 154(b) by 424 days.

(21) Appl. No.: 14/345,647

(22) PCT Filed: Sep. 21, 2012

(86) PCT No.: PCT/DE2012/000957
§ 371 (c)(1),
(2) Date: Mar. 18, 2014

(87) PCT Pub. No.: WO2013/041085
PCT Pub. Date: Mar. 28, 2013

(65) Prior Publication Data
US 2014/0348287 A1  Nov. 27, 2014

(30) Foreign Application Priority Data

Sep. 21, 2011 (DE) .................. 10 2011 114 342
Apr. 17, 2012 (DE) .................. 10 2012 007 933

(51) Int. Cl.
*G21C 15/24* (2006.01)
*G21C 3/44* (2006.01)
(Continued)

(52) U.S. Cl.
CPC .............. *G21C 15/24* (2013.01); *G21C 1/02* (2013.01); *G21C 1/22* (2013.01); *G21C 1/32* (2013.01);
(Continued)

(58) Field of Classification Search
CPC . G21C 15/24; G21C 1/02; G21C 1/22; G21C 1/32; G21C 3/44; G21C 3/54;
(Continued)

(56) References Cited

U.S. PATENT DOCUMENTS 3,251,745 A * 5/1966 Teitel ....................... G21C 5/20
  376/359
3,730,266 A * 5/1973 Kottowski ............. G21C 15/24
  376/380

(Continued)

*Primary Examiner* — Jack W Keith
*Assistant Examiner* — Daniel Wasil
(74) *Attorney, Agent, or Firm* — Buchanan Ingersoll & Rooney PC (57) ABSTRACT

The present invention describes a nuclear reactor with a loop for liquid nuclear fuel, which, contrary to similar systems like the Molten-Salt Reactor of the Generation-IV canon, does not use the fuel loop for the heat transport at the same time. Instead, cooling is provided by an additional coolant loop, which is intensively coupled to the nuclear fuel duct for heat transport. That way, the advantages of liquid fuel can be utilized while optimizing the coolant loop performance, so the complexity of safety systems can be reduced significantly. This reactor design further includes an optimized neutron economy and is able to deactivate long-lived fission products generated by its own, so only short-lived radiotoxic waste has to be stored. With the neutron surplus it is also possible to deactivate long-lived radiotoxic waste from used fuel of today's light water reactors or to produce medical radioisotopes.

10 Claims, 3 Drawing Sheets

(51) Int. Cl.
   *G21C 15/02*   (2006.01)
   *G21C 1/32*    (2006.01)
   *G21C 3/54*    (2006.01)
   *G21D 5/08*    (2006.01)
   *G21C 1/02*    (2006.01)
   *G21C 15/28*   (2006.01)
   *G21C 19/307*  (2006.01)
   *G21C 1/22*    (2006.01)
   G21C 15/247    (2006.01)

(52) U.S. Cl.
   CPC .............. *G21C 3/44* (2013.01); *G21C 3/54* (2013.01); *G21C 15/02* (2013.01); *G21C 15/28* (2013.01); *G21C 19/307* (2013.01); *G21D 5/08* (2013.01); G21C 15/247 (2013.01); *Y02E 30/30* (2013.01)

(58) Field of Classification Search
   CPC ...... G21C 15/02; G21C 15/28; G21C 19/307; G21D 5/08
   USPC .................................................. 376/360, 361
   See application file for complete search history.

(56) References Cited

U.S. PATENT DOCUMENTS

| | | | |
|---|---|---|---|
| 2009/0279658 A1* | 11/2009 | Leblanc | G21C 1/22 376/360 |
| 2012/0051481 A1* | 3/2012 | Shu | G21C 15/02 376/174 |

* cited by examiner

DUAL FLUID REACTOR

STATE OF THE ART

Virtually all of today's commercial reactors are thermal, water-cooled, water-moderated, and use solid fuel elements. They have a burn-up of less than 1% of the natural uranium, and require enrichment as well as external reprocessing. Even the concepts of the Generation IV use solid fuel elements and therefore still need a fuel cycle industry. The only exception is the Molten-Salt Reactor, (MSR,) in which the fuel is circulating in liquid form and reprocessed in intervals. In the MSR, the liquid fuel is simultaneously used as a coolant, which basically has the following advantages:

A. Advantages of a Liquid Circulating Fuel:
Molten-salt or any other form of liquid fuel allows a continuous online reprocessing directly at the reactor core, remarkably reducing the shutdown time. Radioactive fission fragments can continuously be removed, eliminating the risk of residual heat accidents. As the core is already molten, core molten down accidents are not possible. Furthermore, the core can be drained by a passive melting fuse plug in case of overheating or for maintenance. For a high power density and an effective fuel reprocessing, the temperature should be as high as possible.

B. Advantages of High Boiling Point Coolant:
Molten-salt or any other liquid with a high boiling point for cooling allows the operation at normal pressure in the core region. This in turn enables a compact design with no need for an expensive pressure vessel. The high boiling point concept is also implemented in the Generation IV designs of the Lead-cooled fast reactor (LFR) and the Sodium-Cooled Fast Reactor (SFR).

Uniting both fuel and cooling in one single reactor loop combines the advantages (A) and (B above). However, it also restricts the fuel/cooling material to satisfy both, fuel and cooling conditions. The material is essentially restricted to molten-salt which is a tradeoff between high-temperature fuel, low-temperature cooling, and an acceptable heat capacity. The result is the MSR. Neither its thermal nor its recently proposed fast neutron spectrum variant can be operated at temperatures high enough for process chemistry, e.g. hydrogen production, or for a high electric conversion efficiency.

For the fuel reprocessing, the following concepts exist:

C. Offsite Reprocessing
The usual aqueous organic reprocessing techniques like PUREX and derived ones are offsite. They have the following properties:
They require times of several years for temporary decay storage, otherwise the expensive organic solvents are destroyed by radiolysis too fast.
The separation precision for multiple elements is low.
The reactions proceed slowly at normal temperature.
Large volumes of consumed auxiliary chemicals with medium and low radioactivity are produced that have to be disposed of.
For these reasons they cannot be used for online fuel reprocessing.

D. Onsite Reprocessing
The Integral Fast Reactor (IFR) used electrorefining of the used fuel in order to remove some of the fission products without element separation, which is sufficient to regain criticality in a fast reactor with the reprocessed metallic fuel elements. This procedure is applied on the plant's site but not online E. Online Reprocessing
Reprocessing in the MSR as provided by the Generation IV concept is in fact only possible in batch operation. For this purpose the reactor must be shut down and the fuel branched into a reprocessing system. Continuous reprocessing conflicts with the cooling function. The processing facility needs to have a high capacity in order to keep the outage of the reactor short. Nevertheless, such pyrochemical processing facilities are comparatively small. The main component is a vapor-phase fluoride-salt distillation system where the metal salts are separated by boiling points. However, many fluorides have very high boiling points so that additional fluorination is required, and metal fluorides yet remain in a slurry needing further treatment.
Nevertheless, batch operation is basically compatible with a continuous fuel circulation if small buffers are installed before and/or behind the reprocessing system, storing some of the fuel while the other part is just being processed.

None of the Generation IV concepts provides a real online fuel reprocessing without interrupting the reactor operation, so that never all of the advantages mentioned in (A) can be exploited.

The more apart from online fuel reprocessing the higher are the criticality reserves needed for a long-term stable operation of the reactor. It also requires neutron absorbers (burnable neutron poison) for a fresh fuel in order to keep the neutron economy constant albeit deteriorating it considerably, too. This becomes particularly important for sub-critical systems driven by an accelerator (ADS). The higher the criticality reserves, the larger the accelerator needed to produce the missing neutrons. For this reason there exists no reactor concept that can be used as an ADS system with a small accelerator.

Additional problems arise when the heat transfers to a working gas because of the higher power density. Inside the steam turbine loop of existing common nuclear power plants, indirect heat exchangers are used, often designed as steam generators where the primary coolant deposits its heat power. This also holds for plants of the Generation IV canon, which use supercritical carbon dioxide as a secondary coolant. The problem is that heat exchangers in nuclear reactors usually are bulky. While heat exchangers in common pressurized water reactors have a size similar to the reactor vessel itself, ten times larger indirect heat exchangers would be needed for reactors with a very high power output, which reduces the high economic efficiency of such a reactor significantly.

Therefore, the main task is to create a reactor design using liquid nuclear fuel, which is cooled in such a way that the advantages in (A) and (B) above can be fully exploited. Additionally, a real online reprocessing without the need of a reactor shutdown as described in (D) should be implemented. A third task is the operation of an ADS system with a compact external neutron source. Furthermore, a high operating temperature is desirable to make process chemistry applications and a higher electric conversion efficiency possible. Additionally, heat transfer should be optimized to minimize capital costs.

Solution by Two Cycles
The present invention solves these problems by separating the fuel loop from the coolant loop. It will be called in the following "Dual Fluid Reactor" and abbreviated as "DFR". The DFR can be combined with a chemical reprocessing unit, which works online at high temperature within the fuel loop. The DFR can also be used sub-critically with a compact accelerator.

Disentangling the cooling function from the fuel relieves the restrictions mentioned above. All advantages of a high-temperature liquid fuel (A above) and a coolant with a high boiling point (B above) are now achievable. As there are no material restrictions for the coolant due to the fuel function, liquid metals can be used, so that the DFR can be operated with a high power density at very high temperatures. This opens new, highly effective possibilities for the true online nuclear fuel reprocessing without the need for a reactor shutdown. As for any other kind of a high-temperature reactor, electricity as well as process heat (e.g. hydrogen production) can also be utilized more effectively. The high charge density of liquid metals allows the utilization of magneto-hydrodynamic (MHD) generators for electricity generation in the primary or in an additional secondary coolant loop. MHD pumps can also be used for liquid metal pumping.

Now the circulation speed of the fuel loop can be adjusted to any nuclear purposes like maximum burn-up, transuranium element incineration, isotope production, breeding of fissile material, or specific deactivation of fission products (transmutation).

Operating the DFR with a liquid metal coolant results in a fast (hard) neutron spectrum resulting in low cross sections for all neutron induced nuclear reactions. This requires a compact construction with a concentrated (undiluted) fuel fluid causing a high power density. Both the molten-salt fuel and in particular the liquid metal coolant have high heat transport capabilities, well suited to the requirements of a high powered compact core. The material that separates the two fluids must have a sufficient heat conduction capability and resistance to corrosion by the salt and the liquid metal. In comparison to the conditions in thermal neutron reactors the choice of isotopes for the structural wall material opens widely because of the low neutron capture cross sections for fast neutrons. Appropriate materials were developed decades ago, even if they contain rare, and hence expensive, chemical elements. Contrary to solid fuel elements, which are changed regularly, the wall materials remain in the DFR, thus even rare noble metals might be used as ingredients for the alloy, yet with low impact on the total costs of the plant.

The DFR must not be confused with the consideration of a two-fluid reactor design within the Molten-Salt Reactor Experiment (MSRE) at the Oak Ridge National Lab. There, a piping inside a molten diluted uranium-233 fuel salt core was considered to be filled with fertile thorium fluoride salt in order to circumvent the problem of separating the thorium fluoride from the lanthanide fluorides produced by the fission because of near high boiling points. This was abandoned due to the difficulties of finding a suitable pipe material in the thermal neutron spectrum.

True Online Fuel Reprocessing of the DFR

The present invention includes improved methods for dry high temperature processing that can now be used in combination with the fuel cycle in a very effective manner. Basically, all separation techniques of the process chemistry are suitable here, especially the separation based on thermal properties (distillation, rectification), on density differences (centrifuges) and on the chemical composition and the mobility of electric charges (electroraffination).

Due to the ionic nature of the bond, the used fuel salt is impervious to radiolysis and as such becomes directly apt for physicochemical separation methods at high temperatures. Two such methods have been proven in the past: the molten-salt electrorefining method of the IFR (see D above) and the high temperature distillation of the MSR (see E above). Both can be utilized in the DFR. The capacity of the pyrochemical facility can be even designed much smaller because the processing is performed online continuously. In a simple version, the electrorefining method can be used in order to purify the fuel salt by precipitation of a fission product mixture. For the purpose of specific transmutation a more precise separation is required which can be accomplished by fractionated distillation/rectification which is beyond the MSR principle.

Fluoride salts still have considerable moderating quality thus softening the neutron spectrum and deteriorating the neutron economy. This together with the high boiling points of many of the involved metal fluorides render fluorides inapplicable. Higher halogens are more practical with respect to both properties. For the metals in the used fuel mixture chloride salts have sufficiently low boiling points so that a separation by boiling points in a fractionated distillation facility alone becomes feasible.

Dual Fluid ADS System

The true online reprocessing highly qualifies the DFR for an accelerator driven sub-critical system ADS. Neutron poisons are constantly removed from the fuel and the reactor core can be kept as close as 0.1% below the criticality level. A small ion accelerator with the beam directed onto a target inside the reactor core can produce a sufficiently high number of neutrons to lift the system into criticality. This way, the DFR can be fully controlled by the accelerator providing a possibility of a fast reactor shutdown.

Direct-Contact Heat Exchanger

Regarding the heat removal from a reactor with a high power density and high operating temperature a special issue occurs. On the one hand, the high operating temperature enables the usage of gas turbines, on the other hand, even the usage of a supercritical steam turbine would not outbid the performance. Additionally, the DFR has a very high power density. Therefore, to remove the heat only coolants with best known heat transfer capability, i.e. metal coolants, are appropriate, while the gas coolant inside the turbine cycle has the lowest heat transfer capability. This would lead to heat exchangers with ten times the volume of the reactor core causing them to become a dominant part of the capital costs. To lower these construction costs it is advisable to use a direct-contact heat exchanger. These heat exchangers are commonly used in air conditioning technologies or wet cooling towers. Here, direct contact means that there is no structural barrier between the two heat carriers. Heat is usually transferred from water droplets to air which is at most in an ambient condition.

Functional Principle of the Direct-Contact Heat Exchanger

According to this invention the liquid metal coolant will be injected into a high-pressure gas jet from the turbo compressor inside an intermix chamber of the direct-contact heat exchanger causing the gas to be heated via the large surface of the droplets inside a small volume. The heated gas jet passes a separator to remove the liquid metal from it via the centrifugal principle before it enters the turbine.

The usage of a direct-contact heat exchanger in the DFR system is advantageous because of the higher economic efficiency. In this context, the aforementioned direct-contact heat exchanger can also be used in other reactor designs of the Generation IV canon. Its integration into an LFR would be advantageous if a higher operating temperature would be possible per design. Today, the operating temperature of its actual design is technically limited to below 700° C. because steel alloys are used as a structural material and for fuel rod claddings for economic reasons. Direct-contact heat exchangers can also be integrated the Very High Temperature Reactor (VHTR) if molten-salt coolants are used here, which would be a further possible application. Sodium-cooled reactors (SFRs) have an inherently too low operating temperature due to the Sodium's low boiling point for a useful gas turbine usage.

DETAILED DESCRIPTION OF A PREFERRED EMBODIMENT

Reactor Core

Figure 1:
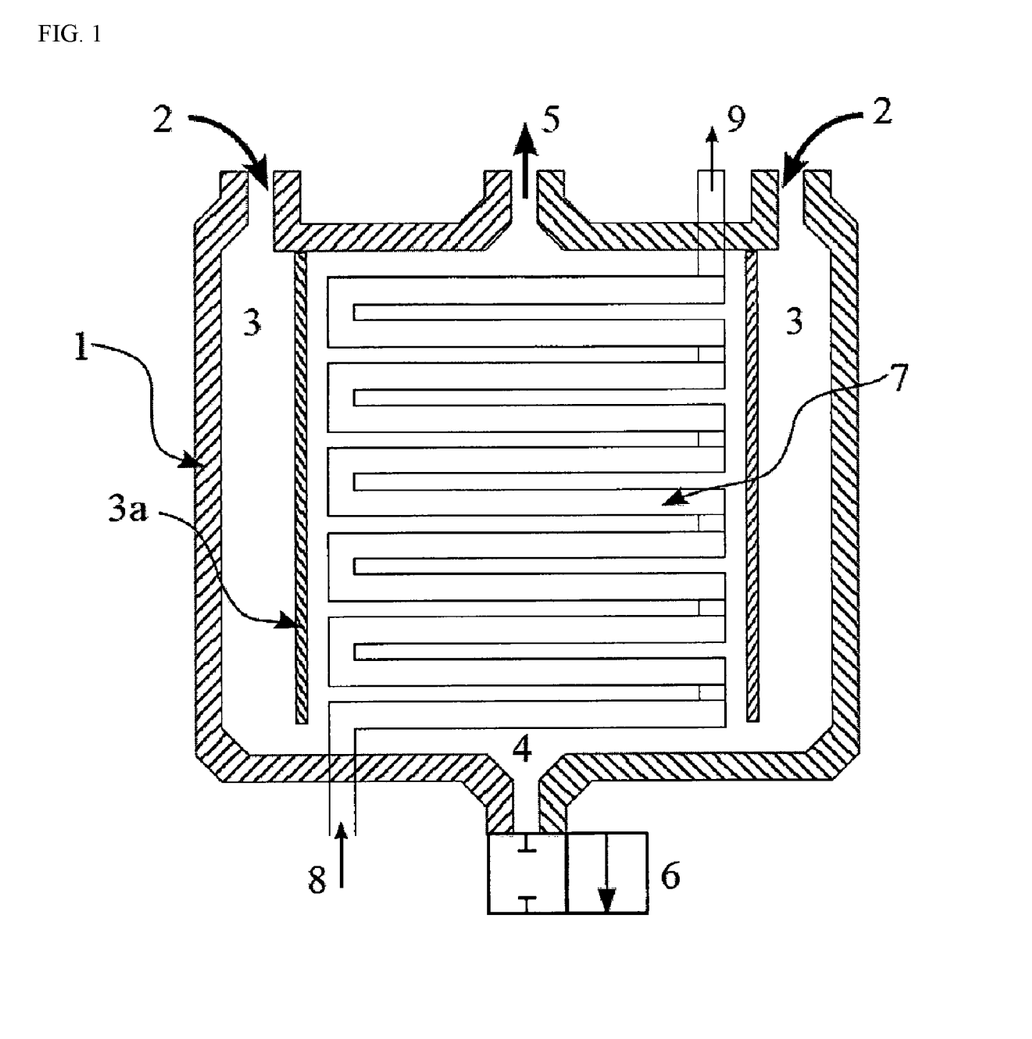
FIG. 1 schematically shows a preferred embodiment of the reactor core.

The reactor core shown in FIG. 1 comprises a reactor core vessel filled with the coolant (1) and the fuel pipe (7) where the liquid fuel is pumped through. The fuel pipe (7) is formed in a manner to fill the reactor core vessel (4) as compactly as possible while the coolant must still be capable of removing the heat sufficiently and uniformly.

Figure 2:
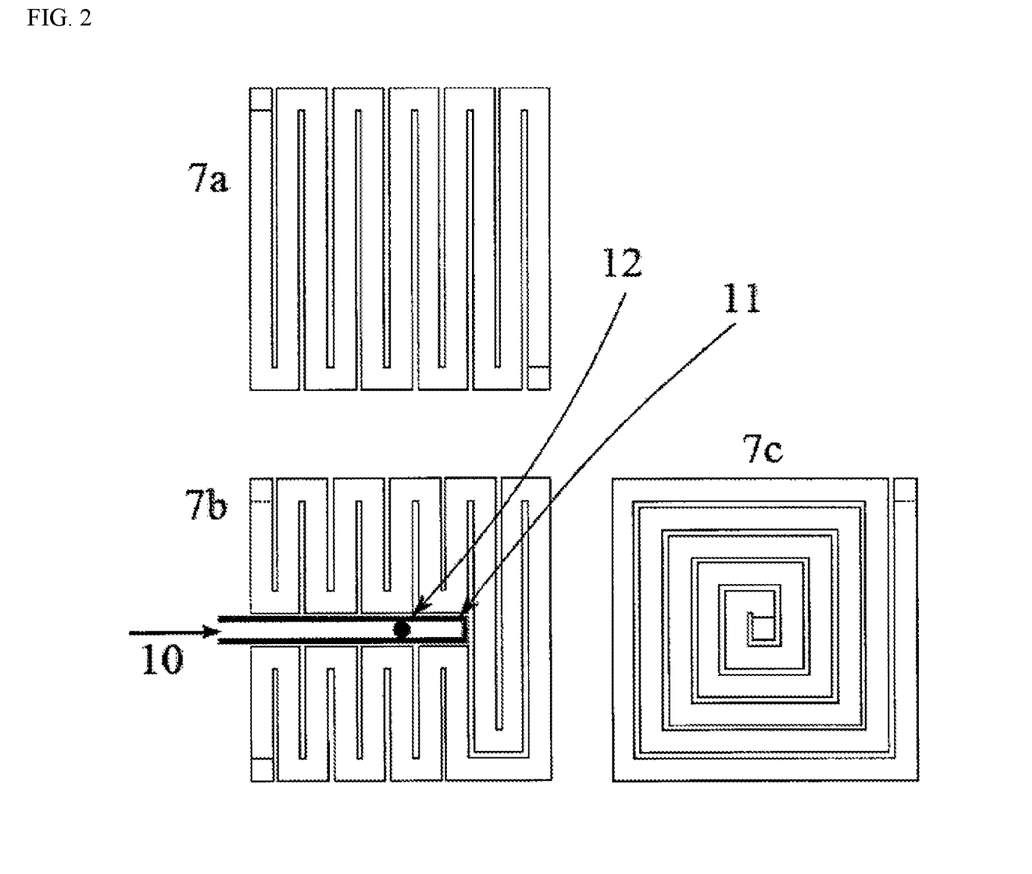
FIG. 2 shows different shapes of the fuel duct.

The top view of one level of the fuel pipe (7) in different possible embodiments is shown in FIG. 2. The pipe shape shown in FIG. 7a) is most simple to manufacture. For an ADS system, the central level has a different shape (7b) in order to be able to direct a particle beam (10) from an external accelerator into the center of the reactor core onto a neutron producing target (12). Instead of the target (12), also neutron sources working without an accelerator can be mounted. The fuel pipe can also be spiral-like as indicated in (7c), which allows for a cylindrical vessel shape.

The coolant in this preferred embodiment is liquid Lead, circulating at a temperature of around 1000° C. and at atmospheric pressure. Lead incoming from the heat exchanger (22) has a lower temperature. For this reason, the core volume (4) is surrounded by a good heat conducting separation wall (3a). Between this wall (3a) and the outer wall of the reactor core vessel (1) an additional volume, the reflector volume (3), is formed. The "cold" Lead incoming at (2) first moves down through the reflector volume (3) where it heats up by conduction from the inner vessel. There, it also serves as a neutron reflector reducing the loss of neutrons. At the bottom it now moves preheated into the core volume (4). When it moves up it takes the heat from the walls of the fuel duct (7) and leaves the inner vessel on top (5) at a higher temperature level.

For this favored design a liquid salt fuel is used which circulates at a temperature of 1000° C. at normal pressure. The liquid fuel enters the core region (4) at the bottom inlet (8). Inside the core volume, the high neutron flux will cause an appropriate amount of nuclear fission events in the fuel's actinides. The released fission energy heats the fuel, which deposits its thermal power to the coolant via the fuel tube walls. The fission events will generate fast neutrons at the necessary rate to maintain the nuclear chain reaction inside the core volume. While moving slowly through the long tubes more and more actinides will be fissioned causing a chemical composition change of the liquid fuel at the outlet (9) where it is further directed into the pyrochemical processing unit (PPU) (28).

Cooling Cycle and Fuel Cycle

Figure 3:
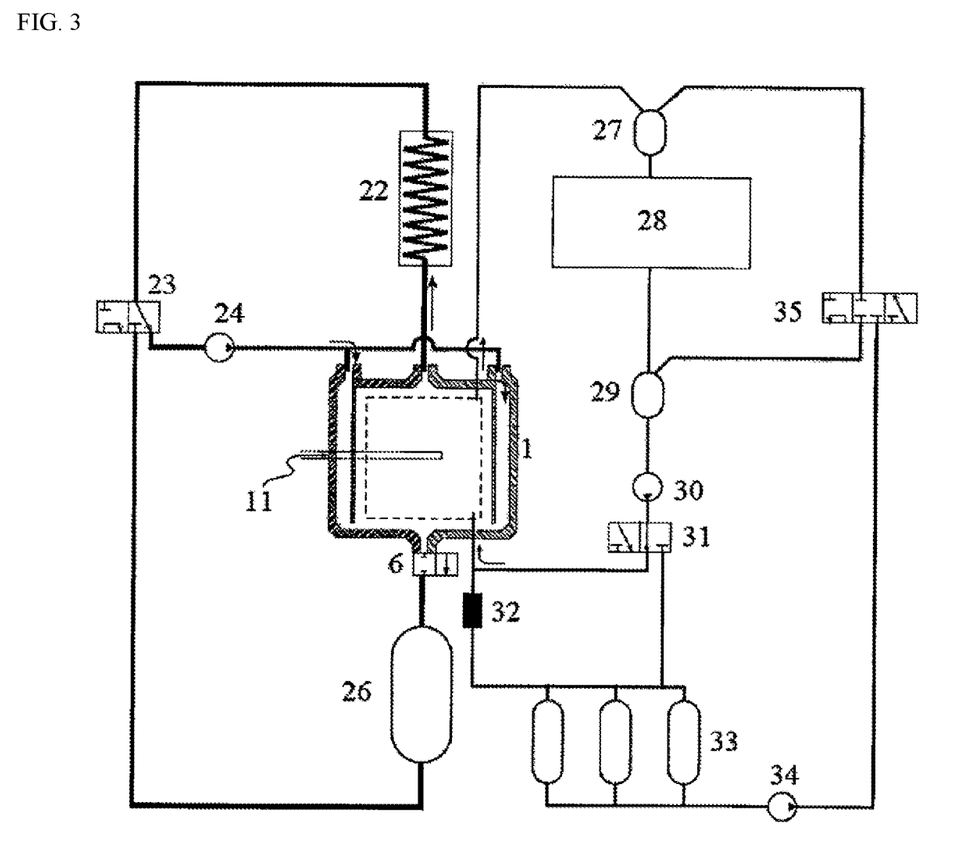
FIG. 3 shows the total system with the cooling and fuel loops.

FIG. 3 shows the outer assembly, the fuel cycle and the coolant cycle.

In the reactor core one primary pipe duct, also referred to as the fuel duct, includes two pumps (30, 34), a pyroprocessing unit (28), a pre-buffer volume (27), a post-buffer volume (29), an actively-cooled fuse plug (32), three sub-critical storage tanks (33) and two multi-way valves (31, 35) wherein the said primary duct enters the core via the inlet (8), is lead through the core volume (4) and leaves the core via the outlet (9). A secondary pipe duct, also referred to as the cooling duct or coolant loop, contains a pump (24), a multi-way valve (23), a coolant storage for temporary disposal (26) and a heat exchanger (22) wherein said secondary duct enters the core vessel (1) via at least one inlet (2), is lead through a reflector volume (3) between a heat-conducting barrier (3a) and the outer wall of the core vessel (1) and additionally through the core volume (4) bathing the fuel duct (7) and leaves the core vessel (1) via the outlet (5).

The heated Lead enters the heat exchanger (22) after leaving the reactor. Depending on the power needs a part of the Lead's heat is taken for electricity production or as process heat. The Lead leaves the exchanger at a lower temperature and, after passing a multi-way valve (23), is being pumped back (24) to the reactor vessel. For maintenance the Lead coolant can also be drained through a valve (6) at the bottom of the reactor vessel into a temporary coolant storage (26) from where it can be pumped back into the reactor vessel passing the multi-way valve (23) from the bottom.

A direct-contact heat exchanger is used as a heat exchanger (22) in a preferred variant of this invention. Here, the direct-contact heat exchanger replaces the combustion chamber of a gas turbine wherein the heat transfer is done by spraying the liquid coolant, favorably a liquid metal, especially Lead, in the gas jet from the turbo compressor in a drift dynamic optimized chamber. The coolant droplets are then removed by a directly connected centrifugal separator before the heated gas enters the turbine.

In a preferred design, the coolant coming from the reactor is slowed down in a special volume to adapt the flow speed to the throughput of the injection pumps for a steady deposition into the intermix chamber. This chamber consists of an array nozzles which spray the high-pressured coolant from the injection pumps as sufficiently small droplets into the high-pressure gas jet. In the case of a power turndown, periodic nozzle sub-arrangements can be deactivated and the droplet size can be adjusted by variable cone drift pins inside the nozzles. So it is possible to maintain the separation efficiency of the centrifugal separator at a lower gas flux, because the droplet size is enlarged, too. The intermix chamber's cross section is congruent along its axial direction and is placed nearby the following separator. The liquid metal, especially Lead, may serve as a lubricant for the injection pump. Lead is preferred as a coolant in this prevention.

The intermix chamber is followed by a separator where the metal droplets are removed from the heated gas. Because the gas moves with a high velocity at high pressures, separators based on the centrifugal principle like cyclone separators or vortex tubes are favorable. These can be arranged as cascades or multiple parallel units to achieve a high separation efficiency. The cleaned gas enters the turbine via nozzles, which provide the thermo-mechanical conversion.

The separator cascade is arranged in a way that a separator with a large diameter is followed by several ones with a smaller diameter, thus having a higher centrifugal force. Therefore, the gas flow is spread to a suitable number of smaller cyclones to remove droplets of decreasing size.

The separated liquid metal from the cyclones is removed by a gearwheel lock, which also transforms the turbine's high pressure to the liquid coolant's ambient pressure, and is deposited in a intermediate storage. From there, the liquid metal is pumped back into the reactor core. Because of the compact arrangement, this storage can be placed directly next to the storage volume for the injection pumps or one bigger storage with a removable barrier to create the two sub-storages can be used. In the case of emergency the barrier can be opened (even manually if the electricity supply is offline) which allows natural convection cooling as a pure liquid metal coolant loop.

The aforementioned heat exchanging processes with the droplets, the removal and deposition of the metal into the storage will even work when the metal droplets are cooled below the melting point, solidifying them. For that, the metal inside the storage must be reheated, e.g. heating by indirect bypassing the hot liquid metal, to liquify the metal particles.

The gas has to be sufficient chemically inert against the liquid metal to prevent chemically stable compounds between them. Nitrogen gas would fulfill this for many metals. However, gas turbines use the Joule-Brayton thermodynamic cycle where single-atomic gases provide efficiency advantages due to the isentropic exponent because of missing molecule's degrees of freedom, which then would absorb energy. For this reason Helium is used in high-temperature gas-cooled reactors wherein Helium also has favorable neutronic properties. The Helium's heat transfer capability is twice as high that of Argon which reduces the needed heat exchanging area. In an indirect-contact heat exchanger which has the appropriate large size and weight the material cost are so high that the usage of Helium would be worthwhile compared to Argon. This point is irrelevant for the said direct-contact heat exchanger proposed in this invention. Furthermore, Argon is significantly cheaper than Helium. Both, the reduced material costs of the heat exchanger and working gas costs of the cheaper Argon reduces the overall costs considerably. In the proposed DFR design using Lead coolant the usage of Lead combined with Argon is preferable.

Usually a separation before the turbine is not fully possible. Modern gas turbines already consist of very resistant materials and are able to handle sulfuric acids and dust particles. The latest developments for increasing the efficiency aim for an operation with direct coal dust firing where the turbines have to handle large amounts of ash. Compared with this, Lead droplets are less problematic, in particular as the gas temperature even behind the turbine is still above the melting point of Lead. Lead adhering on the blades of the rotor and stator would certainly produce an unbalance leading to vibrations of the rotor blades w.r.t. the gas flow which shakes off the droplets. This is particularly true for the side of the turbo compressor. The Lead droplets remaining in the gas flow would freeze out latest in the residual heat exchanger where the working gas dumps its residual heat. Since the Lead has a high heat conductivity, the function of the residual heat exchanger would not be influenced by this process, except for a slow fill-in of Lead which requires regular maintenance. In order to stretch those intervals, it is advantageous to install separators effectuating the already strongly delayed gas flow short before, or in constructional combination with, the residual heat exchanger, like lamella separators, impact separators, receiver separators, and demisters.

The liquid fuel leaving (9) the reactor core is first collected in a pre-buffer (27). From there an amount that can be reprocessed is branched into the PPU (28). The amounts reprocessed there are collected in the post-buffer (29) from where they are pumped (30) through a multi-way valve (31) and through the inlet at the bottom of the reactor core (8) back into the core volume (4). The purpose of the buffers (27) (29) is to temporarily compensate for different through-puts in the reactor and the PPU (28); for the some purpose the sub-critical storage tanks (33) can also be included in the cycle. This is especially necessary if a batch processing technique like electrorefining is employed. The pre-buffer (27) may also be used to purge from the noble gases.

In ADS mode the fuel mixture is retained just below criticality by the PPU (28) so that merely a few per mille of the total neutron flux must be provided by the accelerator neutron source in order to lift the reactor into criticality. In such a way a small accelerator is sufficient instead of a high-energy accelerator with a spallation source.

For maintenance or in case of an emergency a sub-critical fuel storage (33) is provided. It comprises several tanks each of which has a capacity of only a deep sub-critical mass of the molten-salt. The tanks can be filled either through the melting fuse plug at the bottom of the reactor vessel (32) or through the multi-way valve (31) from the post-buffer (29) and the pump.

The actively-cooled melting fuse plug (32) can also be used for a regular shutdown of the system, as it was used in the MSRE at the Oak-Ridge laboratory. It is essentially a pipe segment, which is cooled with a constant heat transportation. Because of the non-negligible heat conduction capability of the molten-salt fuel the heat produced in the core volume (4) is also conducted into the melting fuse plug (32). The constant heat deposit is balanced in a manner that the salt is yet not melting if it has a temperature of 1000° C. in the core. For higher core temperatures or if powered off the heat conducted through the salt will melt the plug, which opens, and drains the fuel to the sub-critical tanks (33). From there it can be pumped up (34), entering the fuel loop again through the multi-way valve (35), either to the pre-buffer (27) or to the post-buffer (29).

The fuel is a combination of a fertile and a fissile actinide salt which can be uranium-238/plutonium-239 or thorium-232/uranium-233. When the uranium-plutonium fuel cycle is utilized the reactor requires an initial load of plutonium (alternatively highly enriched U-235 may be utilized if no Pu is available). The fraction of plutonium depends on the size of the reactor core because of neutron losses through the surface. The maximum is a Pu-239 fraction of 35% required for the smallest useful set-up while larger cores can manage smaller fractions. The other fraction is U-238 as fertile material. The fuel salt would here consist of the trichlorides of the actinides, i.e. UCl3 and PuCl3, which have a suitable temperature range of the liquid state. Purified Cl-37 should be used in order to avoid neutron losses by capture at Cl-35 and production of the long-lived radioactive isotope Cl-36.

Negative Temperature Coefficient

The PPU (28) fabricates a fuel mixture that is critical inside the reactor at the desired operating temperature of 1000° C. There are three main effects that provide negative feedback to the fission reaction rate that reduces the neutron flux when the temperature rises:

Doppler broadening of the resonances in the neutron capture cross sections increases the macroscopic neutron capture cross section.

Density decrease of the molten-salt fuel reduces the fissile nuclei concentration.

Density decrease of the liquid Lead reduces the concentration of the neutron reflecting Lead nuclei.

Because of its high atomic mass and its many stable isotopes due to nuclear shell closure, Lead is an excellent neutron reflector with low moderation qualities and low neutron capture cross sections. These effects together cause a strong negative temperature coefficient in the fast neutron spectrum. This is in contrast to liquid sodium as coolant which has a much higher neutron capture cross section, higher neutron moderation and lower reflection quality which means an increase of the neutron flux with raising temperature, i.e. positive temperature coefficient. A further consequence is that the low radioactivity of Lead renders an intermediary cooling loop superfluous different to sodium.

Startup Procedure

To start up the reactor, the system is pre-heated until the coolant and fuel salt becomes liquid. Concurrently, the cooling of the melting fuse plug (32) is started. The fuel salt is pumped from the storage tanks (33) to the reactor core volume (4). At the tee connector just below the reactor some of the fuel fluid branches to the melting fuse (32) where it freezes out and plugs it. Inside the reactor core volume (4) the fuel becomes critical.

Now, the reactor is regulated by the earlier described physical control loops. At the beginning the fission rate, and correspondingly the power production, is minimal. Then, the coolant pump (24) starts to accelerate the circulation of the Lead. The discharge of heat to the heat exchanger (22) causes a temperature decrease in the reactor (of course the heat exchanger must be able to dump the heat energy). The control loops render the reactor supercritical until the nominal temperature is regained and well-balanced. This may continue until the nominal power output is reached. Conversely, if the Lead circulation speed is decelerated (also in case of a malfunction) the temperature in the reactor increases and it becomes sub-critical until leveled off at the nominal temperature. In this way, the fission rate in the reactor always follows the power extraction.

This equilibrium temperature (operating temperature) will be set and controlled by regulating the fissile inventory fraction (Pu fraction) of the fuel salt. The PPU (28) cares for an appropriate mixture of the fuel.

Shutdown of the Reactor

For a regular shutdown, the coolant circulation and the fuse (32) cooling is stopped, so that the liquid fuel drains onto the sub-critical tanks (33). The same happens if the power to the plant's aggregates fails. If the PPU, for any reason like malfunction and/or sabotage, should mix in too high fractions of fissile material, the equilibrium temperature raises, too, so that again the melting fuse plug kicks in.

Consequently, the emergency shut down is the same as the regular shut down.

Possible Accidents

The PPU (28) continuously removes the fission products from the fuel salt and replaces them with fertile material, e.g. U-238. The residual decay heat of the few fission products in a core load can easily passively be dissipated from the storage tanks (33). In summary, for all known typical dangerous reactor accidents like 'loss of power accident', 'loss of coolant accident', 'criticality accident', or 'decay heat' the DFR behaves well mannered as for a regular shutdown.

Application of the Neutron Surplus

With the uranium-plutonium cycle, the fission of plutonium produces a high neutron yield. Even after regeneration of the Pu-239 by conversion of U-238 a large neutron surplus remains. If only U-238 is fed into the fuel, this neutron surplus will end up as additional plutonium. The conversion rate is now greater than 1 and the reactor works in breeder mode.

The neutron surplus can also be used for other transmutation purposes, such as when long-lived fission products are specifically mixed in the fuel salt by the PPU (28). There is still a considerable neutron surplus when the reactor transmutes its own long-lived fission products, which can be used to transmute fission products from used fuel elements of other nuclear reactors. Only if the neutron surplus is consumed ulterior the reactor works as a self-burner, i.e. conversion rate equal to 1.

Alternatively the PPU (28) can mix in thorium or inert materials to even out the neutron surplus.

The fission neutron yield of U-233 from the thorium-uranium fuel cycle is considerably lower than for the Pu-239 fission. It is possible to operate the DFR as a fast neutron Th-U breeder with a conversion rate slightly larger than 1. The transmutation of the own long-lived fission products may be feasible. For that, the PPU (28) needs to separate out and store the Pa-233 until it has decayed to U-233. The PPU can frame the transition from the U-Pu to the Th-U fuel cycle continuously.

The fissile material in the fuel salt may also contain transuranium elements from used nuclear fuel elements. As in the case of fission product transmutation, the PPU (28) would process chlorine salts made of the fuel pellets of used fuel elements separating the chemical elements by boiling points. Then the PPU (28) mixes the fuel salt from the desired actinides so that the criticality condition in the core is maintained. In this way the sources of fuel are natural uranium, depleted uranium, nuclear waste, and thorium.

Further DFR Design Variants

The main reasons for Lead as coolant selection are low moderation as well as low neutron capture cross sections, high neutron reflection capability and good thermal conductivity. Other materials like tin or complex alloys may reduce structural material corrosion but may have worse thermal or neutronic properties, requiring to find an optimum here.

Using a coolant with lower nucleus mass numbers, such as Lithium, and a moderating reflector in the DFR results in a softer, thermal or epithermal, neutron spectrum. This makes a smaller variant of the DFR with less power for mobility applications possible, causing a worse neutron economy and reducing the conversion ratio less than 1 so this variant looses its transmutation capability.

The notation 'fuel cycle' also means 'open fuel cycle' where the fuel is stored in sub-critical storage tanks (33) after once-through usage in the core volume (4). The fuel then can be processed offline or offsite. This variant offers advantages for mobility applications, too, since it is not so sensitive to vibrancy. Inside the reflector volume (3), where the neutron spectrum is softer, additional ducts can be inserted in which transmutable but non-fissionable materials can be transported. These can be separated products from the PPU (28) or inserted independently from elsewhere. In the reflector zone the transmutation rate for some materials could be significantly higher than inside the core volume (4) due to resonant neutron capture.

The liquid fuel can also be a liquid metal alloy whose melting point is below the operation temperature. Due to the higher heat transfer capability and lower corrosion capability compared to a liquid salt the power density as well as the operating temperature can be further increased thus obtaining the maximum economic efficiency of the DFR concept. Because many actinides have a too high melting point, additional metals with sufficient neutronic properties and low melting points must be added to lower the solidus temperature. This composition does not necessarily need to be eutectic. Even if the liquidus temperature is higher than the operating temperature the fuel remains sufficiently pumpable. Suitable metal additives are Lead, Bismuth, and, if necessary, Tin, up to a fraction of 75 mol-%. Higher fuel processing efforts are the main drawback. Two additional processing steps are needed: the conversion of metals into molten metal chlorides and reconversion of the separated chlorides into metals, e.g. via electrolysis. It is also possible to apply pyrochemical separation techniques on the metal alloy fuel and one just has to work only the fuel components further, which cannot be processed that way. Lead, Bismuth and other materials with low boiling points can thus be separated from the fuel via distillation and the remaining slurry must be processed as a metallic salt.

FIGURE CAPTIONS

FIG. 1: reactor core of the DFR
FIG. 2: Possible shapes of the fuel duct
FIG. 3: Overall schematics of the DFR

LEGEND (1) Reactor vessel
(2) Lead inlet
(3) Reflector volume
(3a) Lead separation barrier
(4) Core volume
(5) Lead outlet
(6) Lead drain valve
(7) Fuel duct
(7a) Normal view of the fuel duct
(7b) Beam view of the fuel duct
(7c) Spiral variant of the fuel duct
(8) Fuel inlet
(9) Fuel outlet
(10) Particle beam
(11) Particle beam direction
(12) Neutron-generating target or source
(22) Heat exchanger
(23) Lead valve
(24) Lead pump
(26) Lead storage tank
(27) Fuel pre-buffer volume
(28) Pyrochemical processing unit (PPU)
(29) Fuel post-buffer volume
(30) Fuel pump
(31) Fuel inlet valve
(32) Fuse plug
(33) Sub-critical storage tanks
(34) Fuel redirection pump
(35) Valve for fuel redirection

The invention claimed is:

1. A nuclear reactor including
a primary fuel duct continuous insertion and discharge of liquid fuel into and out of a core vessel,
wherein the primary fuel duct is lead through the core vessel, and
a secondary coolant duct for a liquid coolant,
wherein the coolant enters the core vessel via an inlet,
wherein the coolant passes and bathes the primary fuel and leaves the core vessel via an outlet.

2. The nuclear reactor according to claim 1, wherein the primary fuel duct for liquid fuel contains at least one pump for liquid fuel circulation, at least one pyrochemical processing unit, at least one buffer volume, one fuse plug, one storage volume for holding and providing of the liquid fuel, and at least one valve for fuel flux control; and wherein the secondary coolant duct for a liquid coolant contains at least one pump to circulate the liquid coolant, at least one valve for liquid coolant flux control and at least one volume unit for storing, providing and volume-buffering of the liquid coolant, and wherein the nuclear reactor can be optionally operated as a sub-critical system, and wherein the design of the nuclear reactor enables MHD generator operation.

3. The nuclear reactor according to, claim 1 wherein molten-salt is used as liquid nuclear fuel.

4. The nuclear reactor according to claim 1, wherein halides/halogenides are used for liquid fuel.

5. The nuclear reactor according to claim 1, wherein chlorides are used for liquid fuel.

6. The nuclear reactor according to claim 1, wherein a molten metal containing actinides are used for liquid fuel.

7. The nuclear reactor according to claim 6, wherein metal elements are added to the molten metal to decrease the solidus temperature of the molten metal below the operating temperature to ensure that the melt is pumpable.

8. The nuclear reactor according to claim 7, wherein the metal elements are selected from an ensemble consisting of Lead, Bismuth and Tin.

9. The nuclear reactor according to claim 1, wherein the liquid coolant is a liquid metal.

10. The nuclear reactor according to claim 9, wherein Lead is the liquid coolant.

* * * * *